US012646846B2

(12) United States Patent
Lu et al.

(10) Patent No.: US 12,646,846 B2
(45) Date of Patent: Jun. 2, 2026

(54) HETEROGENEOUS MATERIAL INTEGRATION ANTENNA

(71) Applicant: INDUSTRIAL TECHNOLOGY RESEARCH INSTITUTE, Hsinchu (TW)

(72) Inventors: Chun-An Lu, Taipei City (TW); Wei-Yu Li, Hsinchu City (TW); Wei Chung, Hsinchu County (TW); Jiun-Jang Yu, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 32 days.

(21) Appl. No.: 18/733,338

(22) Filed: Jun. 4, 2024

(65) Prior Publication Data

US 2025/0210869 A1 Jun. 26, 2025

(30) Foreign Application Priority Data

Dec. 21, 2023 (TW) ................................ 112150111

(51) Int. Cl.
*H01Q 9/04* (2006.01)
*H01Q 21/00* (2006.01)

(52) U.S. Cl.
CPC ....... *H01Q 9/0485* (2013.01); *H01Q 21/0068* (2013.01)

(58) Field of Classification Search
CPC .. H01Q 9/0485; H01Q 21/0068; H01Q 15/08; H01Q 15/10; H01Q 19/062; H01Q 9/0407
See application file for complete search history.

(56) References Cited

U.S. PATENT DOCUMENTS 5,444,453 A * 8/1995 Lalezari ............... H01Q 9/0407 343/846
7,525,506 B2 4/2009 Wu et al.
(Continued)

FOREIGN PATENT DOCUMENTS

CN 205488535 U 8/2016
CN 109459805 A 3/2019
(Continued)

OTHER PUBLICATIONS

TW Office Action dated Feb. 3, 2025 in application 112150111.
Tayeb et al., "Compact Directive Antennas Using Metamaterials" 2002.

*Primary Examiner* — Dameon E Levi
*Assistant Examiner* — Jordan E. DeWitt
(74) *Attorney, Agent, or Firm* — Maschoff Brennan

(57) ABSTRACT

A heterogeneous material integration antenna includes grounded conductive layer, dielectric layer, dielectric pieces, and antenna conductive structure. Dielectric layer is spaced apart from grounded conductive layer by first distance, and dielectric layer has first dielectric constant. Dielectric pieces each are formed in dielectric layer. Dielectric pieces are adjacent to one another and arranged in dielectric array. Outline of outermost edge of dielectric array forms dielectric region having area. The adjacent ones of dielectric pieces are spaced apart from each other by second distance. Dielectric pieces each have second dielectric constant. Magnitude of second dielectric constant is higher than magnitude of first dielectric constant. Antenna conductive structure is disposed between grounded conductive layer and dielectric array. Antenna conductive structure is electrically connected to signal source. Signal source excites antenna conductive structure to generate at least one resonant mode covering at least one communication frequency band.

10 Claims, 10 Drawing Sheets

(56) References Cited

U.S. PATENT DOCUMENTS

| | | | | |
|---|---|---|---|---|
| 8,081,138 | B2 | 12/2011 | Wu et al. | |
| 8,373,613 | B2 | 2/2013 | Lin et al. | |
| 11,201,394 | B2 | 12/2021 | Jia | |
| 11,777,228 | B2 * | 10/2023 | Povalac | H01Q 5/35 343/702 |
| 2010/0134371 | A1 * | 6/2010 | Worl | H01Q 9/27 343/895 |
| 2017/0062935 | A1 * | 3/2017 | Ganchrow | H01Q 9/0421 |
| 2018/0342789 | A1 * | 11/2018 | Jiang | H01Q 1/528 |
| 2019/0018299 | A1 * | 1/2019 | Park | G02F 1/292 |
| 2019/0252771 | A1 * | 8/2019 | Yong | H01Q 21/22 |
| 2020/0006862 | A1 * | 1/2020 | Thompson, Jr. | H01Q 1/246 |
| 2020/0251826 | A1 * | 8/2020 | Onaka | H01Q 5/335 |
| 2021/0265741 | A1 * | 8/2021 | Kenington | H01Q 21/24 |
| 2022/0311134 | A1 | 9/2022 | Karch | |
| 2022/0320752 | A1 * | 10/2022 | Hara | H01Q 9/0407 |
| 2022/0359980 | A1 * | 11/2022 | Lin | H01Q 1/38 |
| 2023/0411870 | A1 * | 12/2023 | Sudo | H01Q 5/40 |
| 2024/0145929 | A1 * | 5/2024 | Miyazaki | H01Q 15/0013 |
| 2024/0222844 | A1 * | 7/2024 | Chen | H01Q 1/48 |
| 2025/0210869 | A1 * | 6/2025 | Lu | H01Q 15/08 |
| 2025/0273867 | A1 * | 8/2025 | Nakamura | H01Q 15/0013 |
| 2025/0350029 | A1 * | 11/2025 | Ha | H01Q 9/0414 |

FOREIGN PATENT DOCUMENTS

| | | | | |
|---|---|---|---|---|
| TW | 200919826 | A | 5/2009 | |
| TW | I420738 | B | 12/2013 | |
| TW | I761007 | B | 4/2022 | |
| TW | 202239059 | A | 10/2022 | |
| WO | WO-2017058446 | A1 * | 4/2017 | H01Q 9/0407 |
| WO | 2023043179 | A1 | 3/2023 | |

* cited by examiner

HETEROGENEOUS MATERIAL INTEGRATION ANTENNA

CROSS-REFERENCE TO RELATED APPLICATIONS

All related applications are incorporated by reference. The present application is based on, and claims priority from, Taiwan (International) application Ser. No. 112150111 filed on Dec. 21, 2023, the disclosure of which is hereby incorporated by reference herein in its entirety.

TECHNICAL FIELD

The disclosure relates to a heterogeneous material integration antenna.

BACKGROUND

Due to the continuous increase of the demand for the quality and the transmission speed of wireless communication signal, the antenna arrays having high gain and a beam-forming antenna array are rapidly developed. The technologies of the antenna arrays having high gain and the beam-forming antenna array may be able to overcome the loss for wireless channel, achieve the effect of increasing the quality of the received signal and the transmission speed of data, and increase the service range of wireless data transmission.

SUMMARY

An embodiment of the disclosure provides a heterogeneous material integration antenna including a grounded conductive layer, a dielectric layer, a plurality of dielectric pieces, and an antenna conductive structure. The dielectric layer is spaced apart from the grounded conductive layer by a first distance, and the dielectric layer has a first dielectric constant. The dielectric pieces each are formed in the dielectric layer. The dielectric pieces are adjacent to one another and arranged in a dielectric array. An outline of an outermost edge of the dielectric array forms a dielectric region having an area. The adjacent ones of dielectric pieces are spaced apart from each other by a second distance. The dielectric pieces each have a second dielectric constant. A magnitude of the second dielectric constant is higher than the magnitude of the first dielectric constant. The antenna conductive structure is disposed between the grounded conductive layer and the dielectric array. The antenna conductive structure is electrically connected to at least one signal source. The at least one signal source excites the antenna conductive structure to generate at least one resonant mode. The at least one resonant mode covers at least one communication frequency band.

In order to provide a better understanding of the above and other content of the disclosure, the following embodiments are given and described in detail with reference to the accompany drawings as follows:

DETAILED DESCRIPTION

The detailed features and advantages of the disclosure are described in detail in the following detailed description, the content is sufficient to understand the technical content of the disclosure and implement accordingly for those skilled in the art. According to the content, claims and drawings disclosed in this specification, those skilled in the art can easily understand the relevant purposes and advantages of the disclosure. The following embodiments further describe the perspective of the disclosure in detailed, but do not limit the scope of the disclosure in any perspective.

Figure 1A:
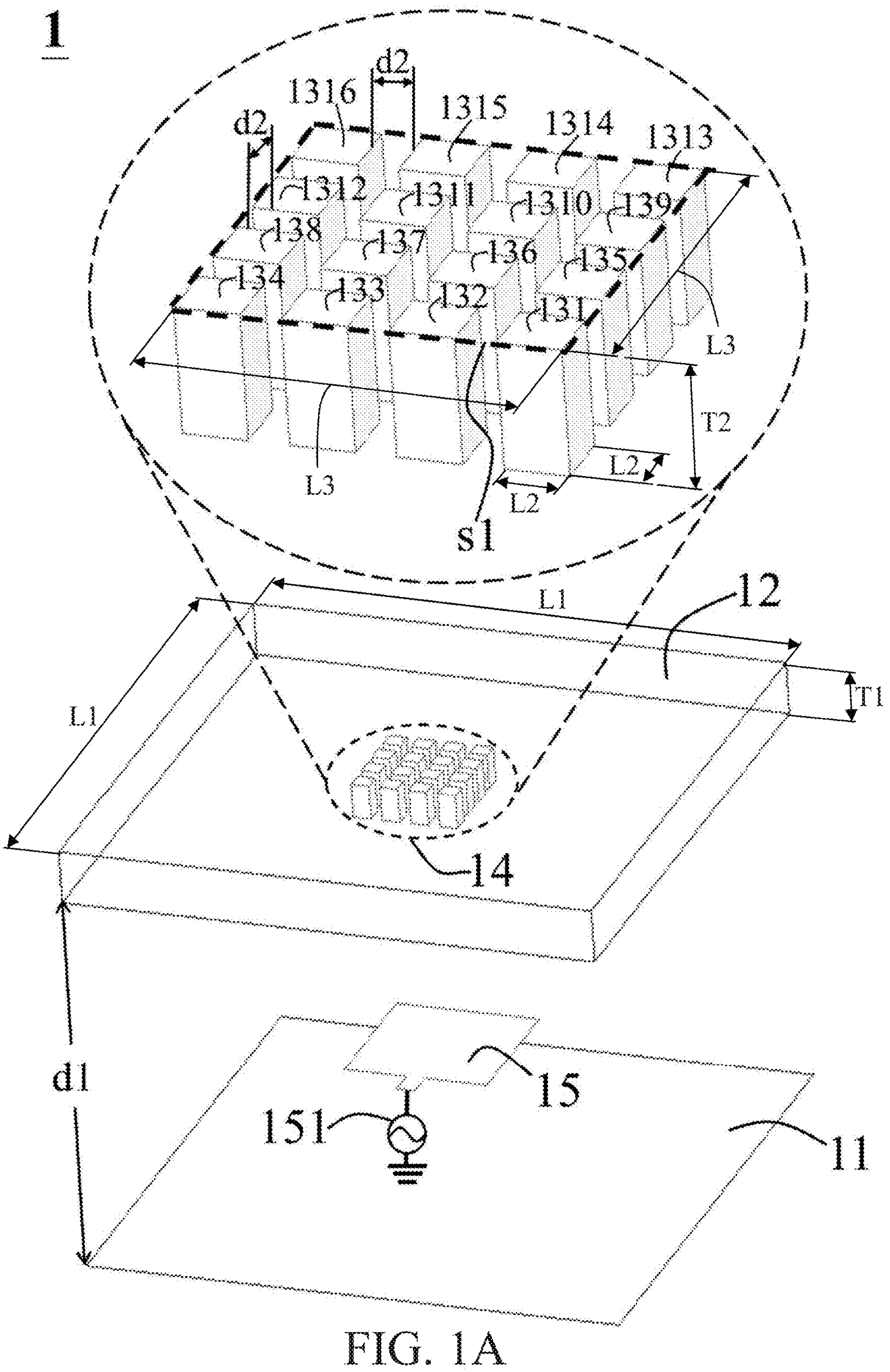
FIG. 1A is a structural diagram of a heterogeneous material integration antenna of one embodiment of the disclosure.

Please refer to FIG. 1A that is a structural diagram of a heterogeneous material integration antenna 1 of one embodiment of the disclosure. In this embodiment, the heterogeneous material integration antenna 1 includes a grounded conductive layer 11, a dielectric layer 12, a plurality of dielectric pieces 131-139 and 1310-1316, and an antenna conductive structure 15.

The dielectric layer 12 is spaced apart from the grounded conductive layer 11 by a first distance d1. The dielectric layer 12 has a first dielectric constant. In this embodiment, for example, a magnitude of the first dielectric constant ranges from 1.53 to 6.83.

Each of the dielectric pieces 131-139 and 1310-1316 is formed in the dielectric layer 12, and is, for example, in a column shape with square cross-section. The dielectric pieces 131-139 and 1310-1316 are adjacent to one another and arranged in a dielectric array 14. An outline of an outermost edge of the dielectric array 14 forms a dielectric region s1 having an area. For example, the dielectric region s1 of this embodiment is in a rectangular shape. The adjacent ones of dielectric pieces 131-139 and 1310-1316 are spaced apart from each other by a second distance d2. The dielectric pieces 131-139 and 1310-1316 each have a second dielectric constant. In this embodiment, for example, the magnitude of the second dielectric constant ranges from 8.33 to 38.63. In addition, the magnitude of the second dielectric constant is higher than the magnitude of the first dielectric constant. In this embodiment, for example, the first dielectric constant of the dielectric layer 12 and the second dielectric constant of the dielectric pieces 131-139 and 1310-1316 are approximately 2.3 and 20, respectively. In this embodiment, for example, a dissipation factor of the dielectric layer 12 and the dissipation factor of the dielectric pieces are approximately 0.0014 and 0.001, respectively. In this embodiment, for example, the dielectric pieces 131-139 and 1310-1316 are made of an inorganic material and the dielectric layer 12 is made of an organic material.

For examples, a side length L1 of the dielectric layer 12 is approximately 80 millimeters (mm), a thickness T1 of the dielectric layer 12 is approximately 6 mm, the side length L2 of each dielectric piece 131-139 and 1310-1316 is approximately 2.5 mm, the thickness T2 of each dielectric piece 131-139 and 1310-1316 is approximately 4 mm, and the side length L3 of the dielectric region s1 is approximately 12.1 mm.

In this embodiment, the dielectric pieces 131-139 and 1310-1316 are arranged in a 4×4 dielectric array 14, but the disclosure is not limited thereto. In other embodiments, the dielectric pieces may be arranged in a 7×7 dielectric array or other combinations. In such embodiments, the side length of the dielectric layer may be approximately 100 mm, the thickness of the dielectric layer may be approximately 4 mm, the side length of each dielectric piece may be approximately 2 mm, the thickness of each dielectric piece may be approximately 4 mm, the side length of the dielectric region may be approximately 17 mm, and the second distance may approximately range from 0.5 to 1 mm.

Figure 1B:
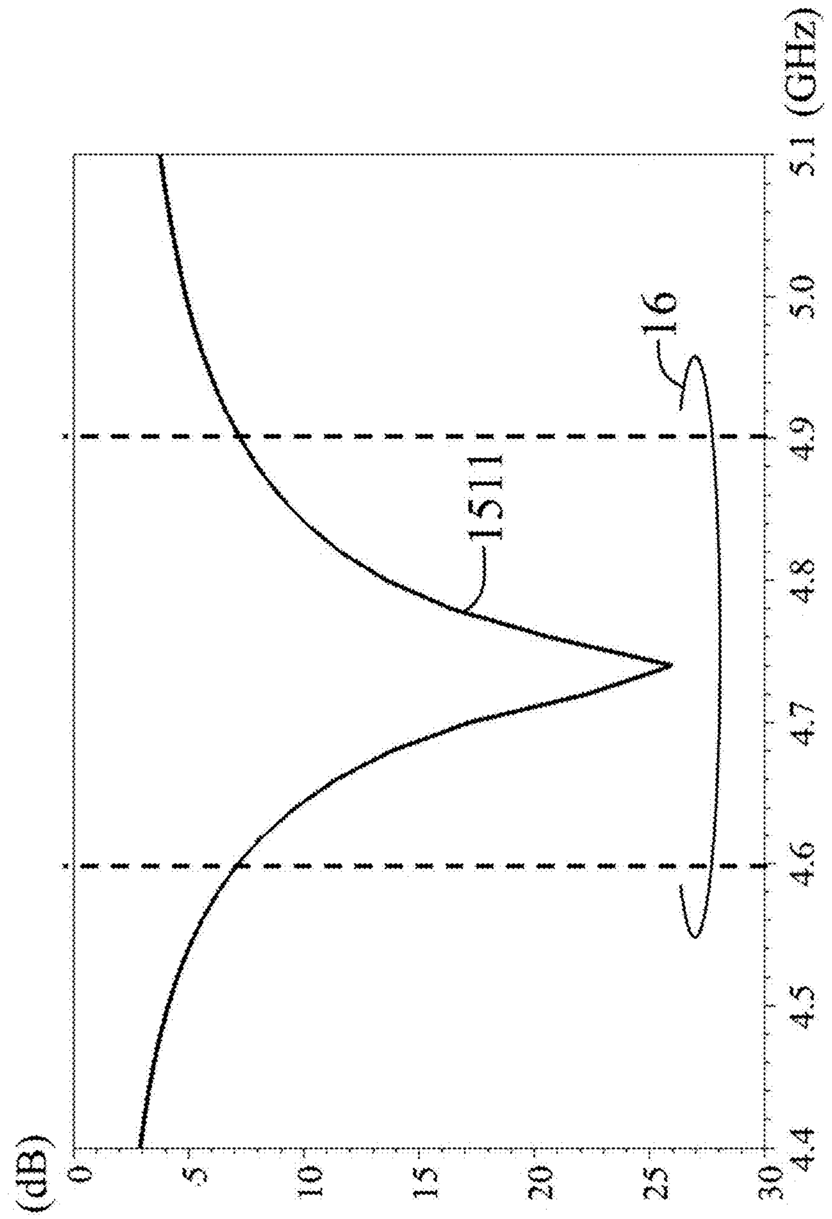
FIG. 1B is a schematic diagram of a return loss curve of the heterogeneous material integration antenna of one embodiment of the disclosure.

Please refer to FIG. 1A and FIG. 1B. FIG. 1B is a schematic diagram of a return loss curve 1511 of the heterogeneous material integration antenna 1 of one embodiment of the disclosure.

In this embodiment, for example, the antenna conductive structure 15 is a group of planar antennas. The antenna conductive structure 15 is disposed between the grounded conductive layer 11 and the dielectric array 14. The antenna conductive structure 15 is electrically connected to at least one signal source 151. The signal source 151 excites the antenna conductive structure 15 to generate at least one resonant mode, where the at least one resonant mode covers at least one communication frequency band 16.

In addition, in this embodiment, for example, the first distance d1 ranges from 0.21 wavelength to 1.33 wavelength of a lowest operating frequency of the at least one communication frequency band. That is, the first distance d1 ranges from 0.21 times to 1.33 times of the wavelength corresponding to the lowest operating frequency of the communication frequency band. For example, as shown in FIG. 1B, in this embodiment, the at least one communication frequency band 16 is between 4.6 GHz and 4.9 GHZ. Therefore, the lowest operating frequency of the communication frequency band 16 is, for example, 4.6 GHz. The wavelength corresponding to the lowest operating frequency may be obtained by dividing the speed of light by the lowest operating frequency, which is, for example, approximately 65.2 mm.

In addition, for example, the area of the dielectric region s1 ranges from a square of 0.01 wavelength to a square of 0.221 wavelength of the lowest operating frequency of the at least one communication frequency band.

In addition, for example, the second distance d2 ranges from 0.0015 wavelength to 0.076 wavelength of the lowest operating frequency of the at least one communication frequency band. That is, the second distance d2 ranges from 0.0015 times to 0.076 times of the wavelength corresponding to the lowest operating frequency of the least one communication frequency. In this embodiment, for example, the second distance d2 is approximately 0.7 mm.

The dielectric pieces 131-139 and 1310-1316 formed in the dielectric layer 12 are arranged in the dielectric array 14, and the magnitude of the second dielectric constant of the dielectric pieces 131-139 and 1310-1316 is higher than the magnitude of the first dielectric constant of the dielectric layer 12. The magnitude of the first dielectric constant ranges from 1.53 to 6.83, and the magnitude of the second dielectric constant ranges from 8.33 to 38.63. Also, the first distance d1 ranges from 0.21 wavelength to 1.33 wavelength of the lowest operating frequency of the at least one communication frequency band, the area s1 of the dielectric region ranges from a square of 0.01 wavelength to a square of 0.221 wavelength of the lowest operating frequency of the at least one communication frequency band, and the second distance d2 ranges from 0.0015 wavelength to 0.076 wavelength of the lowest operating frequency of the at least one communication frequency band. Therefore, the dielectric layer 12 and the dielectric pieces 131-139 and 1310-1316 together form an equivalent periodic structural radio frequency lens with concentric electromagnetic wave energy. In this way, even though the amount of the antenna conductive structure 15 is not increased, the radiation gain of the antenna conductive structure 15 is still increased because of the dielectric layer and the dielectric pieces, and the design of the dielectric array 14 may increase the manufacturing yield.

Figure 1C:
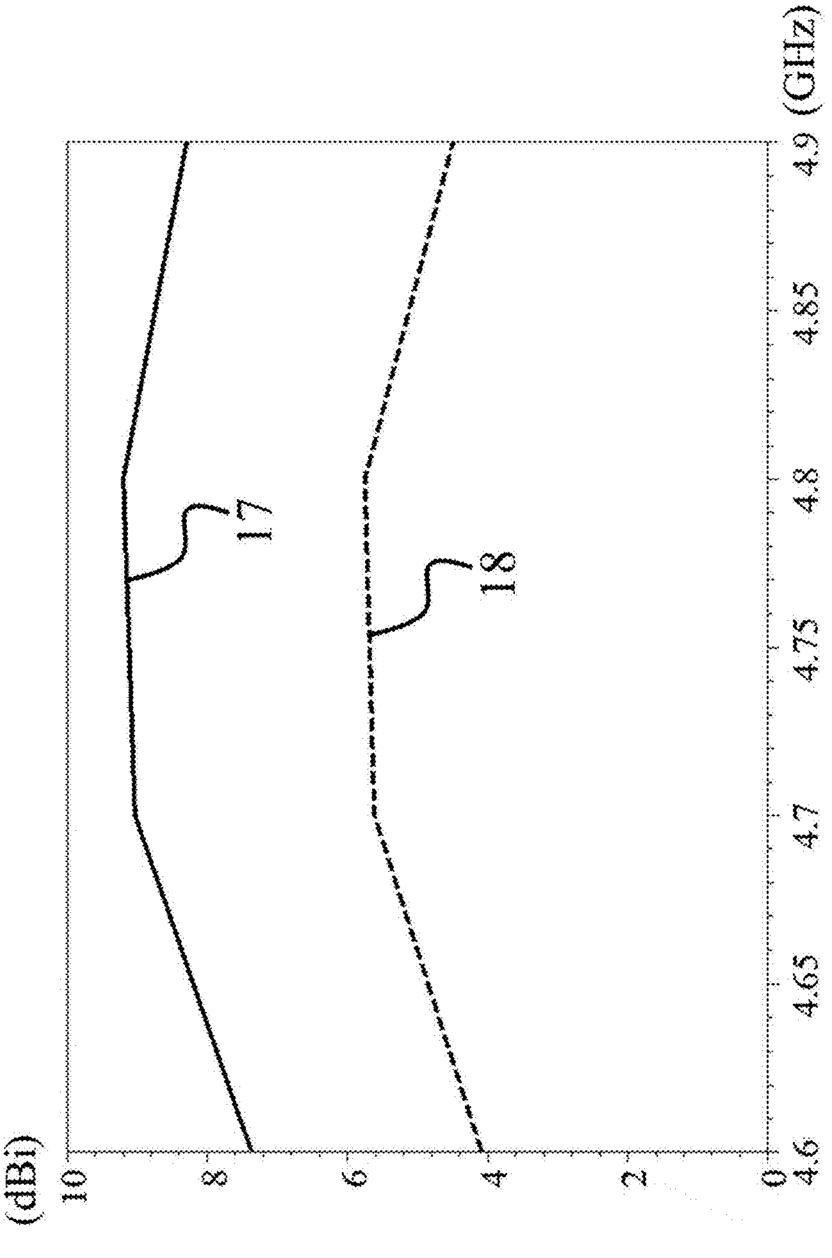
FIG. 1C is a schematic diagram of a radiation gain curve of the heterogeneous material integration antenna of one embodiment of the disclosure and the radiation gain curve of only the antenna conductive structure and the grounded conductive layer.

Specifically, as shown in FIG. 1B, the return loss curve 1511 reaches a good impedance matching level within the range of the communication frequency band 16. Therefore, please refer to FIG. 1C that is a schematic diagram of a radiation gain curve 17 of the heterogeneous material integration antenna 1 of one embodiment of the disclosure and the radiation gain curve 18 of only the antenna conductive structure 15 and the grounded conductive layer 11. Compared with the comparative example that only includes the antenna conductive structure 15 and the grounded conductive layer 11 but does not include the dielectric layer 12 and the dielectric pieces 131-139 and 1310-1316, the heterogeneous material integration antenna 1 of this embodiment significantly increases the radiation gain by approximately 3.28 dBi to 3.76 dBi in the communication frequency band 16 between 4.6 GHz and 4.9 GHZ. In addition, the heterogeneous material integration antenna 1 of the disclosure also has the advantages of simplifying the manufacturing process, facilitating the thinning, and increasing the bandwidth of the antenna conductive structure.

Figure 2:
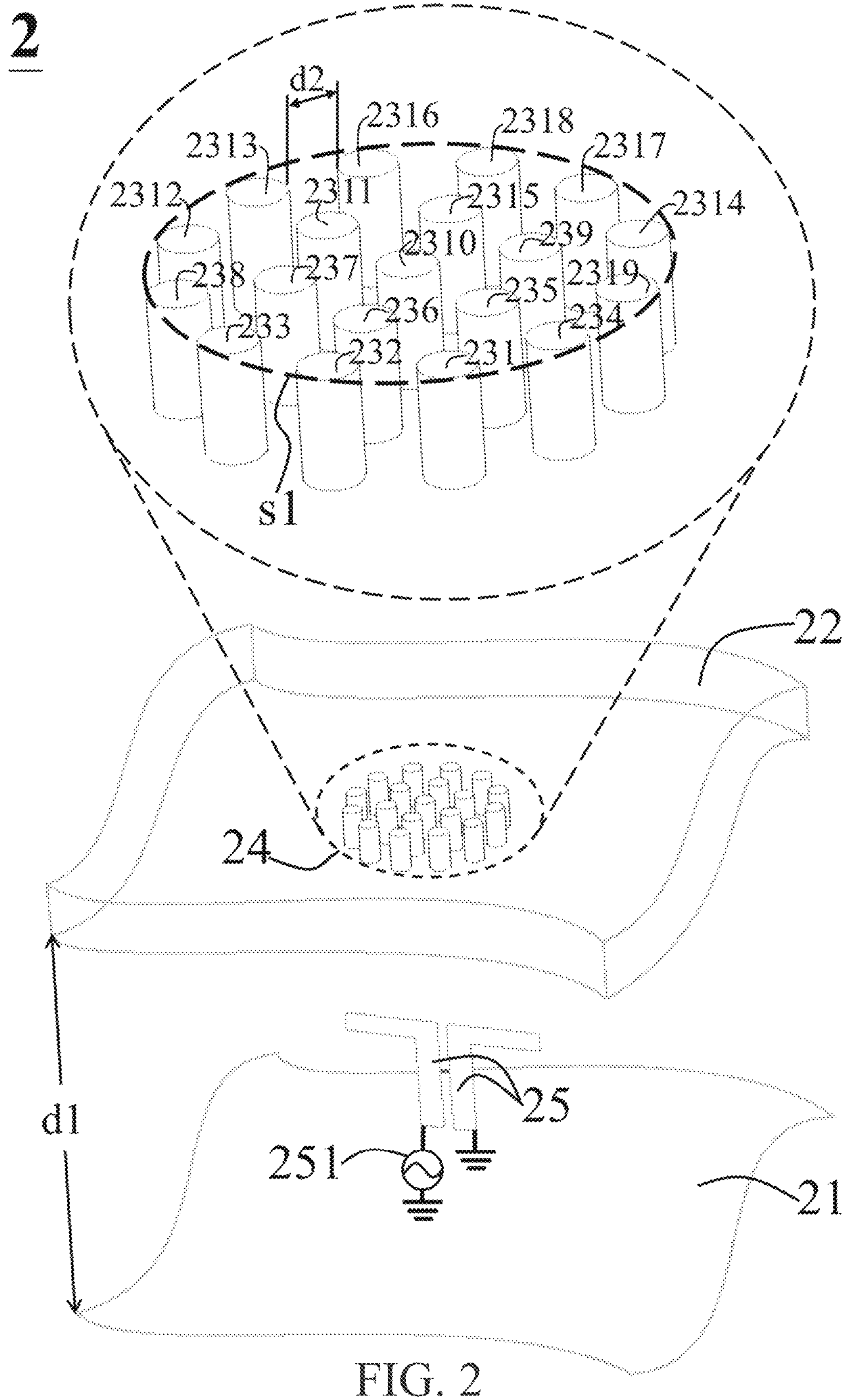
FIG. 2 is a structural diagram of a heterogeneous material integration antenna of one embodiment of the disclosure.

The disclosure is not limited to the configuration of the antenna conductive structure and the shape or arrangement of the dielectric pieces. Please refer to FIG. 2 that is a structural diagram of a heterogeneous material integration antenna 2 of one embodiment of the disclosure. In this embodiment, the heterogeneous material integration antenna 2 includes a grounded conductive layer 21, a dielectric layer 22, a plurality of dielectric pieces 231-239 and 2310-2316 and two antenna conductive structures 25.

The dielectric layer 22 is spaced apart from the grounded conductive layer 21 by the first distance d1. The dielectric layer 22 has the first dielectric constant.

Each of the dielectric pieces 231-239 and 2310-2316 is formed in the dielectric layer 22, and is, for example, in a cylindrical shape. The dielectric pieces 231-239 and 2310-2316 are adjacent to one another and arranged in a dielectric array 24. An outline of an outermost edge of the dielectric array 24 forms the dielectric region s1 having an area. For example, the dielectric region s1 in this embodiment is in a circular shape. The adjacent ones of the dielectric pieces 231-239 and 2310-2316 are spaced apart from each other by the second distance d2. Each dielectric piece 231-239 and 2310-2316 has the second dielectric constant. The magnitude of the second dielectric constant is higher than the magnitude of the first dielectric constant.

For example, two antenna conductive structures 25 are dipole antennas. The antenna conductive structures 25 are disposed between the grounded conductive layer 21 and the dielectric array 24. The antenna conductive structures 25 are electrically connected to at least one signal source 251. The signal source 251 excites the antenna conductive structures 25 to generate at least one resonant mode, where the at least one resonant mode covers at least one communication frequency band. In other embodiments, the antenna conductive structures may also be a group of bent L-shaped antennas.

The range of the magnitude of the first dielectric constant and the second dielectric constant, and the relationships between the first distance d1, the area of the dielectric region s1, the second distance d2, and the communication frequency band are described in the paragraphs relevant to FIG. 1A, and thus the repeated descriptions are omitted.

Figure 3:
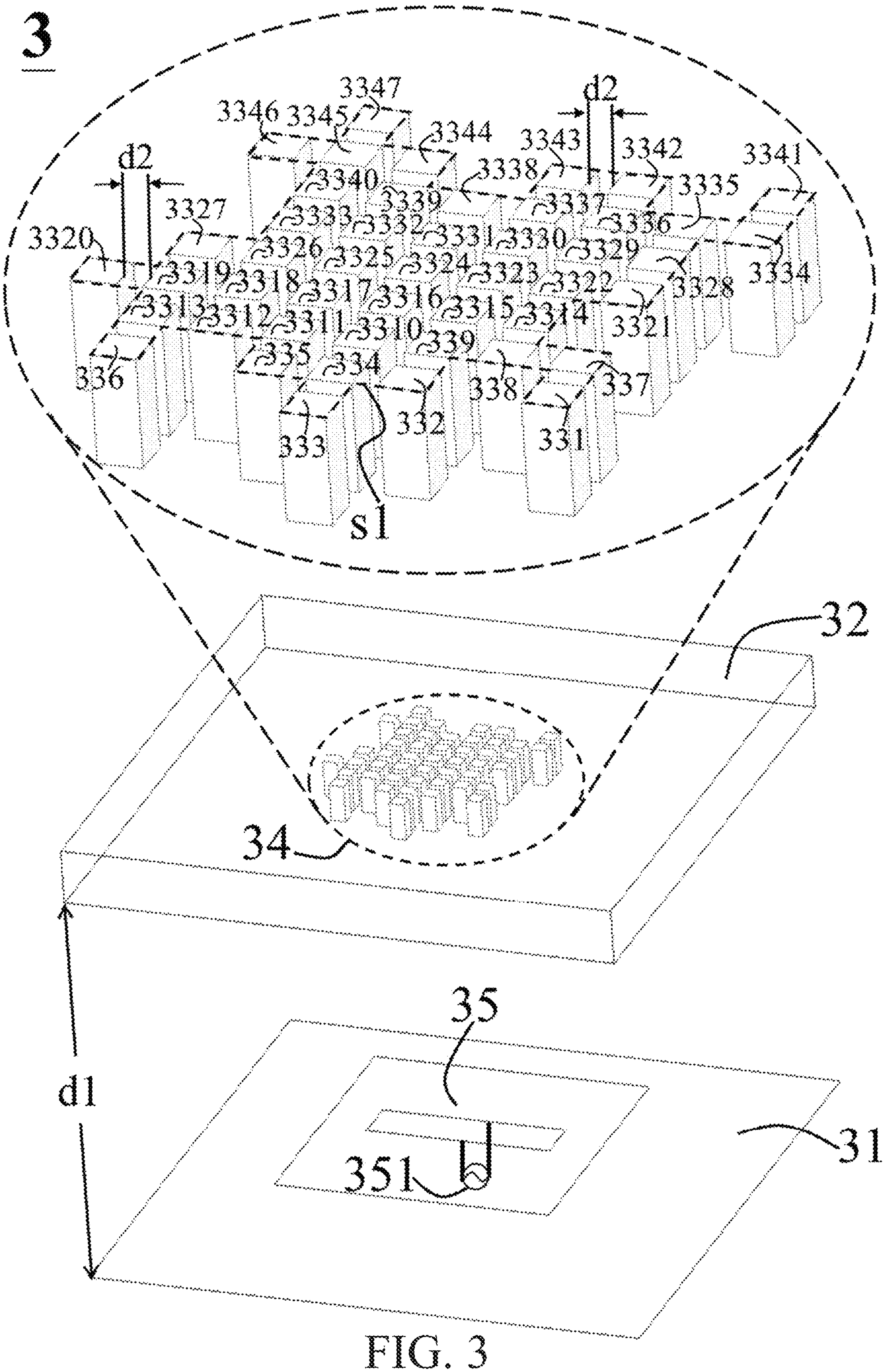
FIG. 3 is a structural diagram of a heterogeneous material integration antenna of one embodiment of the disclosure.

Alternatively, please refer to FIG. 3 that is a structural diagram of a heterogeneous material integration antenna 3 of one embodiment of the disclosure. In this embodiment, the heterogeneous material integration antenna 3 includes a grounded conductive layer 31, a dielectric layer 32, a plurality of dielectric pieces 331-339 and 3310-3347, and an antenna conductive structure 35.

The dielectric layer 32 is spaced apart from the grounded conductive layer 31 by a first distance d1. The dielectric layer 32 has the first dielectric constant.

Each of the dielectric pieces 331-339 and 3310-3347 is formed in the dielectric layer 32, and is, for example, in a column shape with square cross-section. The dielectric pieces 331-339 and 3310-3347 are adjacent to one another and arranged in a dielectric array 34. An outline of an outermost edge of the dielectric array 34 forms the dielectric region s1 having an area. For example, the dielectric region s1 of this embodiment is in an irregular polygonal shape. The adjacent ones of dielectric pieces 331-339 and 3310-3347 are spaced apart from each other by the second distance d2. Each dielectric piece 331-339 and 3310-3347 has the second dielectric constant. The magnitude of the second dielectric constant is higher than the magnitude of the first dielectric constant.

For example, the antenna conductive structure 35 is a group of slot antennas. The antenna conductive structure 35 is disposed between the grounded conductive layer 31 and the dielectric array 34. The antenna conductive structure 35 is electrically connected to at least one signal source 351. The signal source 351 excites the antenna conductive structure 35 to generate at least one resonant mode, where the at least one resonant mode covers at least one communication frequency band. In other embodiments, the antenna conductive structure may be multiple groups of slot antennas.

The range of the magnitude of the first dielectric constant and the second dielectric constant, and the relationships between the first distance d1, the area of the dielectric region s1, the second distance d2, and the communication frequency band are described in the paragraphs relevant to FIG. 1A, and thus the repeated descriptions are omitted.

Figure 4A:
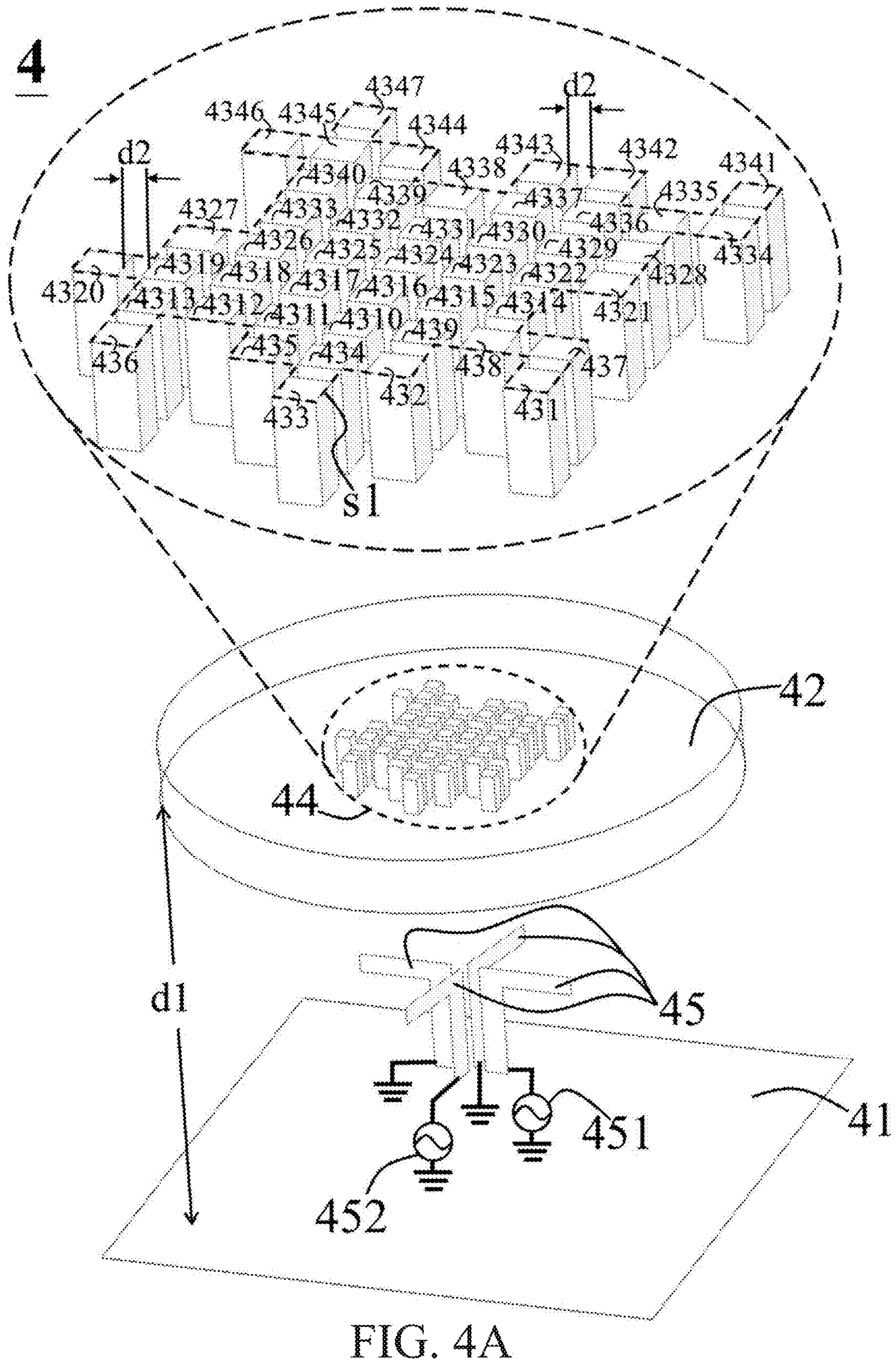
FIG. 4A is a structural diagram of a heterogeneous material integration antenna of one embodiment of the disclosure.
Figure 4B:
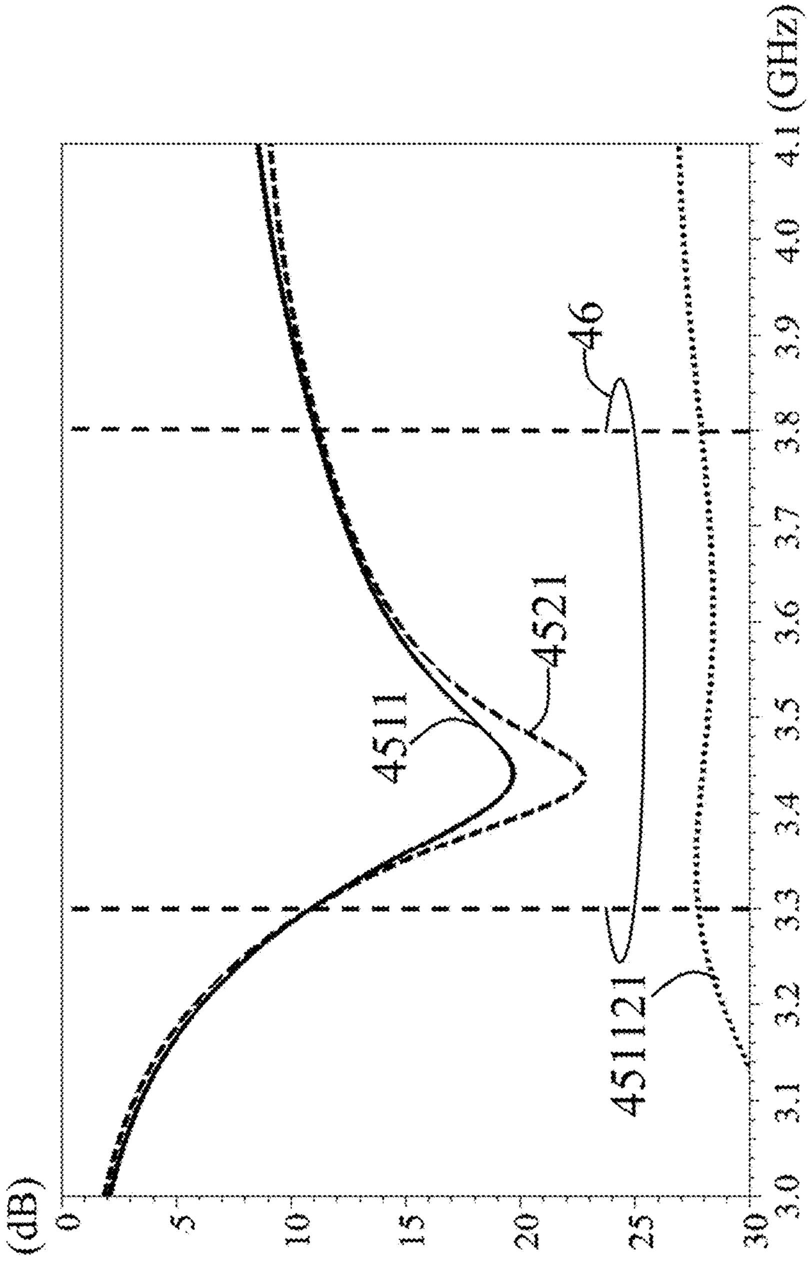
FIG. 4B is a schematic diagram of return loss curves and an isolation curve of the heterogeneous material integration antenna of one embodiment of the disclosure.

The disclosure is also not limited to the amount of the signal source. Please refer to FIG. 4A and FIG. 4B. FIG. 4A is a structural diagram of a heterogeneous material integration antenna 4 of one embodiment of the disclosure, and FIG. 4B is a schematic diagram of the return loss curves 4511 and 4521 and an isolation curve 451121 of the heterogeneous material integration antenna 4 of one embodiment of the disclosure. In this embodiment, the heterogeneous material integration antenna 4 includes a grounded conductive layer 41, a dielectric layer 42, a plurality of dielectric pieces 431-439 and 4310-4347, and an antenna conductive structure 45.

The dielectric layer 42 is spaced apart from the grounded conductive layer 41 by the first distance d1. The dielectric layer 42 has the first dielectric constant.

Each of the dielectric pieces 431-439 and 4310-4347 is formed in the dielectric layer 42, and is, for example, in a column shape with square cross-section. The dielectric pieces 431-439 and 4310-4347 are adjacent to one another and arranged in a dielectric array 44. An outline of an outermost edge of the dielectric array 44 forms the dielectric region s1 having an area. For example, the dielectric region s1 of this embodiment is in an irregular polygonal shape. The adjacent ones of dielectric pieces 431-439 and 4310-4347 are spaced apart from each other by the second distance d2. Each dielectric piece 431-439 and 4310-4347 has the second dielectric constant. The magnitude of the second dielectric constant is higher than the magnitude of the first dielectric constant.

For example, the antenna conductive structure 45 is a dual-polarized antenna. The antenna conductive structure 45 is disposed between the grounded conductive layer 41 and the dielectric array 44, where the antenna conductive structure 45 is a dual-polarized antenna and electrically connected to the signal source 451 and signal source 452. The signal source 451 excites the antenna conductive structure 45 to generate at least one resonant mode corresponding to the return loss curve 4511. The signal source 452 excites the antenna conductive structure 45 to generate at least one resonant mode corresponding to the return loss curve 4521. The resonant mode corresponding to the return loss curve 4511 and the resonant mode corresponding to the return loss curve 4521 cover at least one communication frequency band 46. For example, the communication frequency band 46 is between 3.3 GHZ and 3.8 GHz. Therefore, the lowest operating frequency of the communication frequency band 46 is, for example, 3.3 GHZ.

The range of the magnitude of the first dielectric constant and the second dielectric constant, and the relationships between the first distance d1, the area of the dielectric region s1, the second distance d2, and the communication frequency band are described in the paragraphs relevant to FIG. 1A, and thus the repeated descriptions are omitted.

Figure 4C:
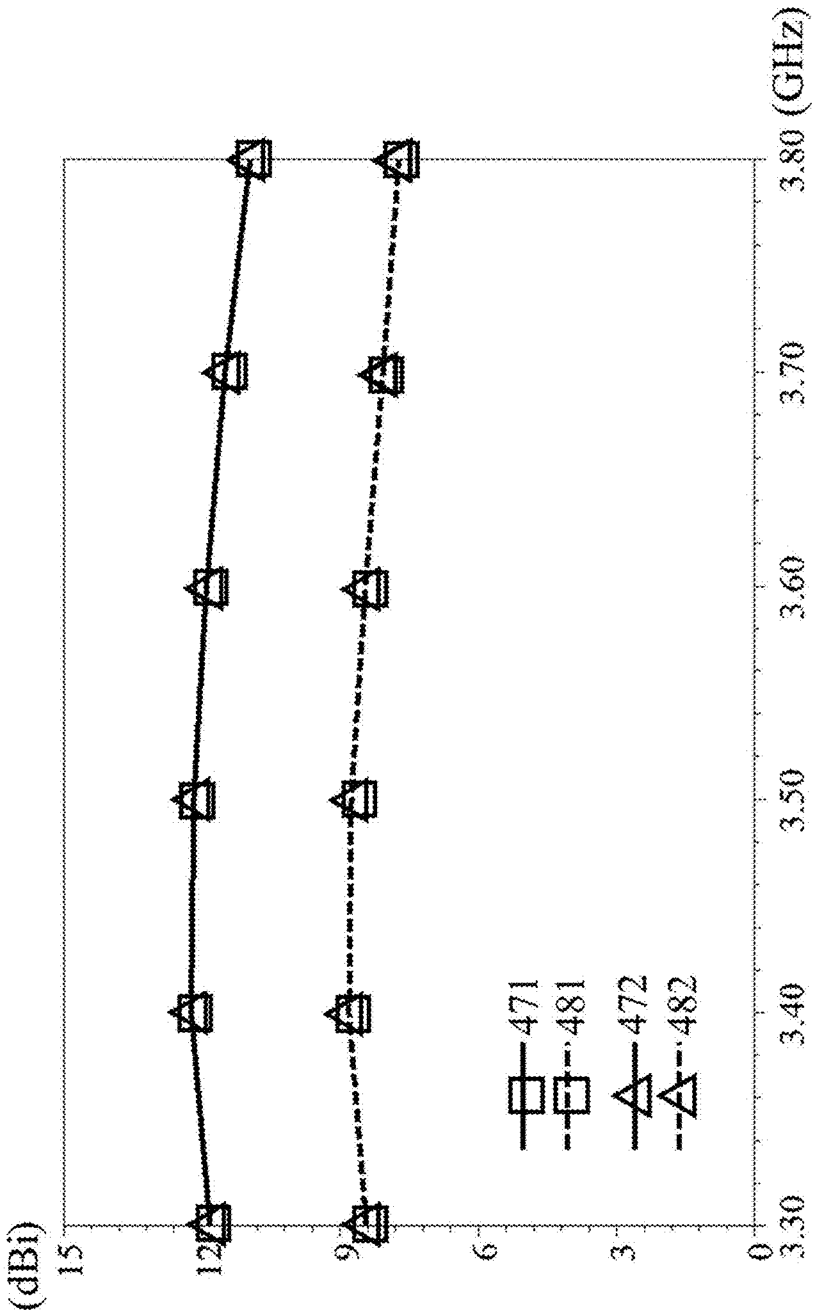
FIG. 4C is a schematic diagram of radiation gain curves of the heterogeneous material integration antenna of one embodiment of the disclosure and radiation gain curves of only the antenna conductive structure and the grounded conductive layer.

As shown in FIG. 4B, the signal source 451 and 452 corresponding to the return loss curve 4511 and 4521, respectively, has a good impedance matching level in the range of the communication frequency band 46, and the isolation curve 451121 has a good isolation magnitude in the range of the communication frequency band 46. Therefore, please refer to FIG. 4C that is schematic diagram of radiation gain curves 471 and 472 of the heterogeneous material integration antenna 4 of one embodiment of the disclosure and the radiation gain curves 481 and 482 of only the antenna conductive structure 45 and the grounded conductive layer 41. Compared with the comparative example that only includes the antenna conductive structure 45 and the grounded conductive layer 41 but does not include the dielectric layer 42 and the dielectric pieces 431-439 and 4310-4347, the heterogeneous material integration antenna 4 of this embodiment significantly increases the radiation gain by approximately 3.2 dBi to 3.6 dBi in the communication frequency band 46.

The heterogeneous material integration antenna of the disclosure may be configured in multiple groups to form a heterogeneous material integration antenna array. In detail, the heterogeneous material integration antenna of the disclosure may be configured in multiple groups of the dielectric array and the antenna conductive structure to form the heterogeneous material integration antenna array. For example, please refer FIG. 5 that is a structural diagram of a heterogeneous material integration antenna array configured by four groups of a heterogeneous material integration antenna of one embodiment of the disclosure. In this embodiment, the heterogeneous material integration antenna array 5 includes a grounded conductive layer 51, a dielectric layer 52, a plurality of dielectric pieces 5311-5319, 53110-53119, 5321-5329, 53210-53219, 5331-5339, 53310-53319, 5341-5349, and 53410-53419, and four groups of the antenna conductive structures 551-554.

The dielectric layer 52 is spaced apart from the grounded conductive layer 51 by the first distance d1. The dielectric layer 52 has the first dielectric constant.

Each of the dielectric pieces 5311-5319, 53110-53119, 5321-5329, 53210-53219, 5331-5339, 53310-53319, 5341-5349, and 53410-53419 is formed in the dielectric layer 52, and is, for example, in a cylindrical shape. The dielectric pieces 55311-5319, 53110-53119, 5321-5329, 53210-53219, 5331-5339, 53310-53319, 5341-5349, and 53410-53419 are adjacent to one another and arranged in four dielectric arrays 541-544. An outline of an outermost edge of the dielectric arrays 541-544 forms four dielectric regions s11-*s*14 each having an area. The dielectric regions s11-*s*14 of this embodiment each are, for example, in a circular shape. The adjacent ones of the dielectric pieces 5311-5319, 53110-53119, 5321-5329, 53210-53219, 5331-5339, 53310-53319, 5341-5349, and 53410-53419 are spaced apart from each other by second distances d21-*d*24. Each of the dielectric pieces 5311-5319, 53110-53119, 5321-5329, 53210-53219, 5331-5339, 53310-53319, 5341-5349, and 53410-53419 has the second dielectric constant. The magnitude of the second dielectric constant is higher than the magnitude of the first dielectric constant.

Figure 5:
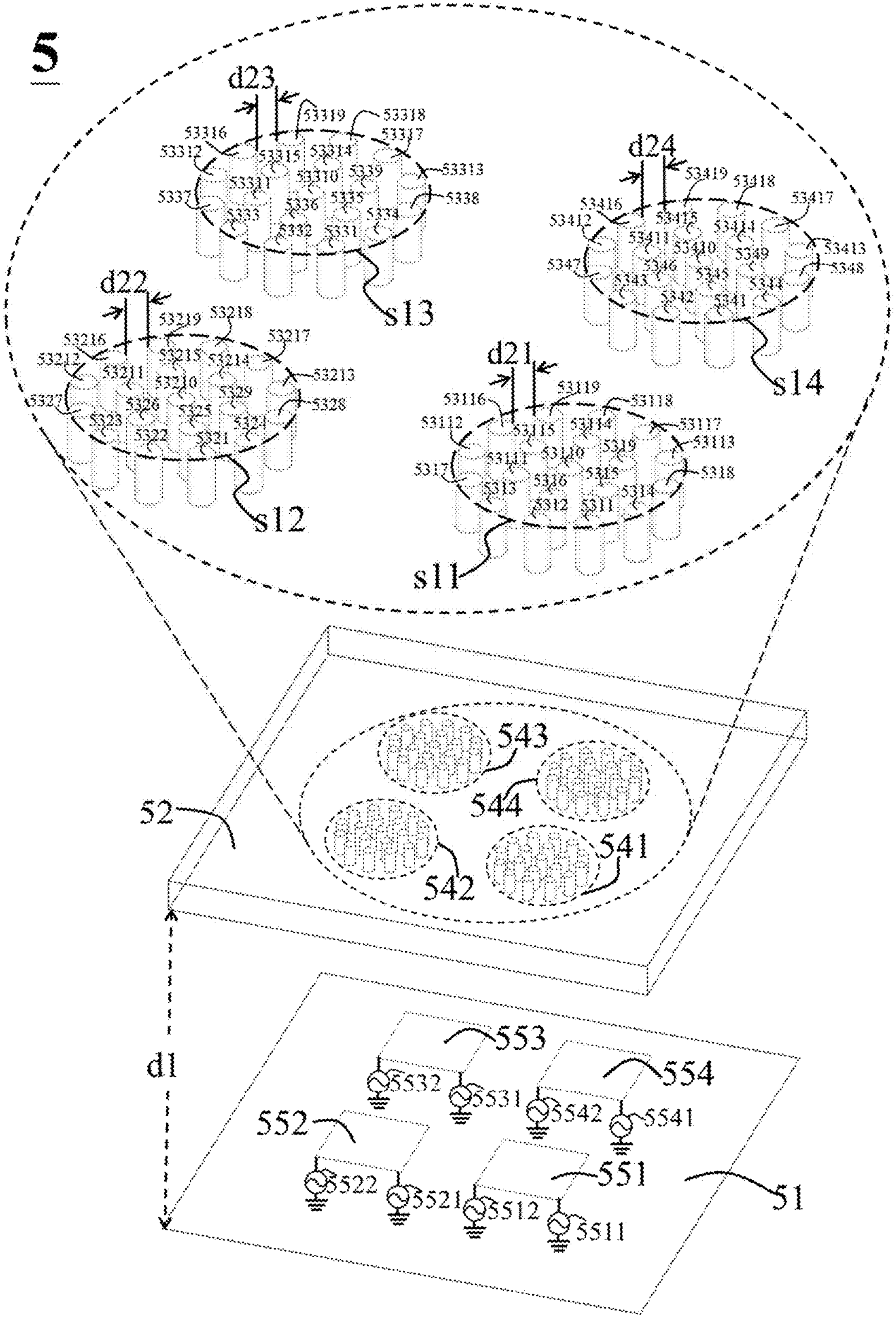
FIG. 5 is a structural diagram of a heterogeneous material integration antenna array configured by four groups of a heterogeneous material integration antenna of one embodiment of the disclosure.

For example, the four antenna conductive structures 551-554 are multiple groups of planar antennas, respectively. The antenna conductive structures 551-554 are disposed between the grounded conductive layer 51 and the dielectric arrays 541-544. This embodiment provides four groups of dielectric arrays 541-544 and the antenna conductive structures 551-554. As shown in FIG. 5, each of the antenna conductive structure 551, 552, 553, and 554 is electrically connected to two signal sources 5511 and 5512, 5521 and 5522, 5531 and 5532, and 5541 and 5542, respectively. The signal sources 5511 and 5512, 5521 and 5522, 5531 and 5532, and 5541 and 5542 excite the antenna conductive structure 551-554, respectively, to generate at least one resonant mode, where multiple groups of the at least one resonant mode each cover at least one communication frequency band.

The range of the magnitude of the first dielectric constant and the second dielectric constant, and the relationships between the first distance d1, the area of the dielectric regions s11-*s*14, the second distances d21-*d*24, and the communication frequency band are described in the paragraphs relevant to FIG. 1A, and thus the repeated descriptions are omitted.

Figure 6:
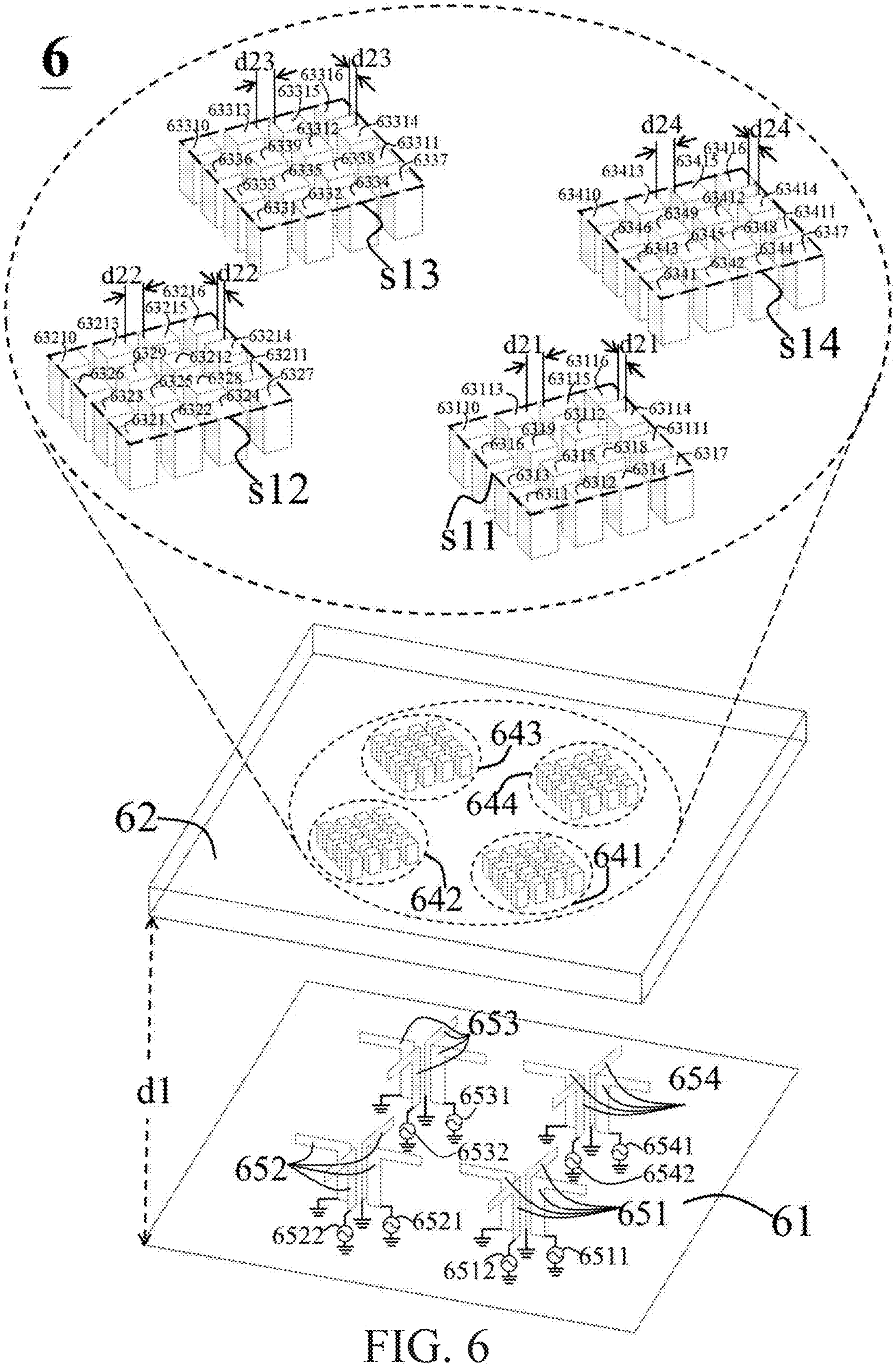
FIG. 6 is a structural diagram of a heterogeneous material integration antenna array configured by four groups of a heterogeneous material integration antenna of one embodiment of the disclosure.

Alternatively, FIG. 6 is a structural diagram of a heterogeneous material integration antenna array configured by four groups of a heterogeneous material integration antenna of one embodiment of the disclosure. In this embodiment, the heterogeneous material integration antenna array 6 includes a grounded conductive layer 61, a dielectric layer 62, a plurality of dielectric pieces 6311-6319, 63110-63116, 6321-6329, 63210-63216, 6331-6339, 63310-63316, 6341-6349, and 63410-63416, and four antenna conductive structures 651-654.

The dielectric layer 62 is spaced apart from the grounded conductive layer 61 by the first distance d1. The dielectric layer 62 has the first dielectric constant.

Each of the dielectric pieces 6311-6319, 63110-63116, 6321-6329, 63210-63216, 6331-6339, 63310-63316, 6341-6349, and 63410-63416 is formed in the dielectric layer 62, and is, for example, in a column shape with square cross-section. The dielectric pieces 6311-6319, 63110-63116, 6321-6329, 63210-63216, 6331-6339, 63310-63316, 6341-6349, and 63410-63416 are adjacent to one another and arranged in four dielectric arrays 641-644. An outline of an outermost edge of the dielectric arrays 641-644 forms four dielectric regions s11-*s*14 each having an area. The dielectric regions s11-*s*14 of this embodiment each are, for example, in a rectangle shape. The adjacent ones of the dielectric pieces 6311-6319, 63110-63116, 6321-6329, 63210-63216, 6331-6339, 63310-63316, 6341-6349, and 63410-63416 are spaced apart from each other by second distances d21-*d*24. Each of the dielectric pieces 6311-6319, 63110-63116, 6321-6329, 63210-63216, 6331-6339, 63310-63316, 6341-6349, and 63410-63416 has the second dielectric constant. The magnitude of the second dielectric constant is higher than the magnitude of the first dielectric constant.

For example, the antenna conductive structures 651-654 each are dual-polarized antennas. The antenna conductive structures 651-654 are disposed between the grounded conductive layer 61 and the dielectric arrays 641-644, where the antenna conductive structure 651 is electrically connected to two signal sources 6511 and 6512, the antenna conductive structure 652 is electrically connected to two signal sources 6521 and 6522, the antenna conductive structure 653 is electrically connected to two signal sources 6531 and 6532, and the antenna conductive structure 654 is electrically connected to two signal sources 6541 and 6542. The signal sources 6511, 6512, 6521, 6522, 6531, 6532, 6541, and 6542 excite the antenna conductive structure 651-654, respectively, to each generate at least one resonant mode, where multiple groups of the at least one resonant mode each cover at least one communication frequency band.

The range of the magnitude of the first dielectric constant and the second dielectric constant, and the relationships between the first distance d1, the area of the dielectric regions s11-*s*14, the second distances d21-*d*24, and the communication frequency band are described in the paragraphs relevant to FIG. 1A, and thus the repeated descriptions are omitted.

In this embodiment, the dielectric pieces 6311-6319, 63110-63116, 6321-6329, 63210-63216, 6331-6339, 63310-63316, 6341-6349, and 63410-63416 are arranged in four 4×4 dielectric arrays 641-644, but the disclosure is not limited thereto. In other embodiments, the dielectric pieces may be arranged in multiple 6×6 dielectric arrays or other combinations. In such embodiments, the side length of the dielectric layer is approximately 150 mm, the thickness of the dielectric layer is approximately 3 mm, the side length of each dielectric piece is approximately 2.2 mm, the thickness of each dielectric piece is approximately 3 mm, the side length of the dielectric region is approximately 15.2 mm, the second distance is approximately 0.4 mm, and the dielectric layer may be spaced apart from the antenna conductive structure by a distance of approximately 55.5 mm.

For example, the heterogeneous material integration antenna arrays 5 and 6 disclosed in FIG. 5 or FIG. 6 may be applied to an antenna system with multiple inputs and multiple outputs, a pattern switchable antenna system or a beam-forming antenna system.

In the embodiments mentioned above, for example, the signal sources 151, 251, 351, 451, 452, 5511, 5512, 5521, 5522, 5531, 5532, 5541, 5542, 6511, 6512, 6521, 6522, 6531, 6532, 6541, and 6542 are transmission lines, impedance matching circuits, amplifier circuits, feed networks, switching circuits, connector components, filter circuits, integrated circuit chips or radio frequency front-end modules.

In other embodiments, the antenna conductive structure may also be one or more groups of dipole antennas, loop antennas or PIFA antennas.

According to the heterogeneous material integration antenna disclosed in the embodiments mentioned above, the dielectric pieces formed in the dielectric layer are arranged in the dielectric array, and the magnitude of the second dielectric constant of the dielectric pieces is higher than the magnitude of the first dielectric constant of the dielectric layer. The magnitude of the first dielectric constant ranges from 1.53 to 6.83, and the magnitude of the second dielectric constant ranges from 8.33 to 38.63. Also, the first distance ranges from 0.21 wavelength to 1.33 wavelength of the lowest operating frequency of the at least one communication frequency band, the area of the dielectric region ranges from a square of 0.01 wavelength to a square of 0.221 wavelength of the lowest operating frequency of the at least one communication frequency band, and the second distance ranges from 0.0015 wavelength to 0.076 wavelength of the lowest operating frequency of the at least one communication frequency band. Therefore, the dielectric layer and the dielectric pieces together form an equivalent periodic structural radio frequency lens with concentric electromagnetic wave energy. In this way, even though the amount of the antenna conductive structure is not increased, the radiation gain of the antenna conductive structure is still increased because of the dielectric layer and the dielectric pieces, and the design of the dielectric array may increase the manufacturing yield.

What is claimed is:

1. A heterogeneous material integration antenna, comprising:

a grounded conductive layer;

a dielectric layer, spaced apart from the grounded conductive layer by a first distance and having a first dielectric constant;

a plurality of dielectric pieces, each formed in the dielectric layer, wherein the plurality of dielectric pieces are adjacent to one another and arranged in a dielectric array, an outline of an outermost edge of the dielectric array forms a dielectric region having an area, adjacent ones of the plurality of dielectric pieces spaced apart from each other by a second distance, the plurality of dielectric pieces each have a second dielectric constant, and a magnitude of the second dielectric constant is higher than a magnitude of the first dielectric constant; and an antenna conductive structure, disposed between the grounded conductive layer and the dielectric array, wherein the antenna conductive structure is electrically connected to at least one signal source, the at least one signal source excites the antenna conductive structure to generate at least one resonant mode, and the at least one resonant mode covers communication frequency band;

wherein the dielectric region is spaced apart from an outermost edge of the dielectric layer.

2. The heterogeneous material integration antenna according to claim 1, wherein the antenna conductive structure is a group of planar antennas, dipole antennas, slot antennas, loop antennas, PIFA antennas, bent L-shaped antennas, or dual-polarized antennas.

3. The heterogeneous material integration antenna according to claim 1, wherein the antenna conductive structure is a plurality of groups of planar antennas, dipole antennas, slot antennas, loop antennas, PIFA antennas, bent L-shaped antenna, or dual-polarized antenna.

4. The heterogeneous material integration antenna according to claim 1, wherein the first distance ranges from 0.21 wavelength to 1.33 wavelength of a lowest operating frequency of the communication frequency band.

5. The heterogeneous material integration antenna according to claim 1, wherein the area of the dielectric region ranges from a square of 0.01 wavelength to a square of 0.221 wavelength of a lowest operating frequency of the communication frequency band.

6. The heterogeneous material integration antenna according to claim 1, wherein the second distance ranges from 0.0015 wavelength to 0.076 wavelength of a lowest operating frequency of communication frequency band.

7. The heterogeneous material integration antenna according to claim 1, wherein the magnitude of the first dielectric constant ranges from 1.53 to 6.83.

8. The heterogeneous material integration antenna according to claim 1, wherein the magnitude of the second dielectric constant ranges from 8.33 to 38.63.

9. The heterogeneous material integration antenna according to claim 1, wherein the at least one signal source is a transmission line, an impedance matching circuit, an amplifier circuit, a feed network, a switching circuit, a connector component, a filter circuit, an integrated circuit chip or a radio frequency front-end module.

10. The heterogeneous material integration antenna according to claim 1, wherein the heterogeneous material integration antenna comprises a plurality of groups of heterogeneous material integration antennas to form a heterogeneous material integration antenna array, and the heterogeneous material integration antenna array is applied to an antenna system with multiple inputs and multiple outputs, a pattern switchable antenna system or a beam-forming antenna system.

* * * * *